US006771444B2

(12) United States Patent
Smith et al.

(10) Patent No.: US 6,771,444 B2
(45) Date of Patent: Aug. 3, 2004

(54) METHOD AND APPARATUS FOR IMPLEMENTING ADAPTIVE REORDERING OF DATA RECOVERY PROCEDURE STEPS IN A DISK DRIVE

(75) Inventors: Gordon James Smith, Rochester, MN (US); Donald Earl Vosberg, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 360 days.

(21) Appl. No.: 10/066,856

(22) Filed: Feb. 4, 2002

(65) Prior Publication Data

US 2003/0151837 A1 Aug. 14, 2003

(51) Int. Cl.[7] ................................................. G11B 5/09
(52) U.S. Cl. ........................... 360/53; 714/769; 714/774
(58) Field of Search ..................... 360/31, 53; 714/701, 714/704, 769, 770, 774

(56) References Cited

U.S. PATENT DOCUMENTS 5,379,162 A * 1/1995 Cunningham et al. ........ 360/53
6,040,953 A * 3/2000 Malone et al. ................ 360/53

* cited by examiner

Primary Examiner—Alan T. Faber
(74) Attorney, Agent, or Firm—Joan Pennington

(57) ABSTRACT

A method and apparatus are provided for implementing adaptive reordering of data recovery procedure (DRP) steps in a direct access storage device (DASD). An initial set of DRP steps is stored. A reorder table is stored during the operation of the DASD. The reorder table includes data recovery data for each data head of successful predefined DRP step numbers. When a DRP process is started, checking for a modified DRP step is performed using the reorder table. Responsive to not identifying the modified DRP step, file parameters for a DRP read operation are set based on the initial set of DRP steps. Responsive to identifying the modified DRP step, file parameters for a DRP read operation are set based on a reordered DRP step that is identified by using the stored successful predefined DRP step numbers in the reorder table. When a successful DRP read operation is identified, the data recovery data in the reorder table are updated. The reordered DRP step is an identified most frequently occurring DRP step number in the reorder table for the current data head. The data recovery data for each data head stored in the reorder table includes a number of total errors, a number of errors above a set threshold, and a reorder flag. The reorder flag is set based upon the number of errors above the set threshold being at least a predefined percentage of the number of total errors. When the reorder flag is set, a reordered DRP step is identified using the stored successful predefined DRP step numbers in the reorder table.

16 Claims, 5 Drawing Sheets

REORDER TABLE 300

| HEAD (& ZONE) 302 | DRP(1) 304 | DRP(2) 304 | DRP(N) 304 | MODE 306 | TOTAL ERRORS 308 | NO. OF ERRORS ABOVE THRESHOLD 310 | REORDER FLAG 312 |
|---|---|---|---|---|---|---|---|
| 0 | | | | | | | |
| 1 | | | | | | | |
| 2 | | | | | | | |
| 3 | | | | | | | |

METHOD AND APPARATUS FOR IMPLEMENTING ADAPTIVE REORDERING OF DATA RECOVERY PROCEDURE STEPS IN A DISK DRIVE

FIELD OF THE INVENTION

The present invention relates generally to the data processing field, and more particularly, relates to a method and apparatus for implementing adaptive reordering of data recovery procedure steps in a direct access storage device (DASD).

DESCRIPTION OF THE RELATED ART

Computers often include auxiliary memory storage units having media on which data can be written and from which data can be read for later use. DASDs or disk drive units incorporating stacked, commonly rotated rigid magnetic disks are used for storage of data in magnetic form on the disk surfaces. Data is recorded in concentric, radially spaced data information tracks arrayed on the surfaces of the disks. Transducer heads driven in a path toward and away from the disk axis of rotation write data to the disks and read data from the disks. Data located on a particular track on a disk surface is read or written by properly positioning a data transducer head directly over the track. In order to maintain the head in proper position over the data track, servo systems typically are incorporated into disk drives.

Figure 2:
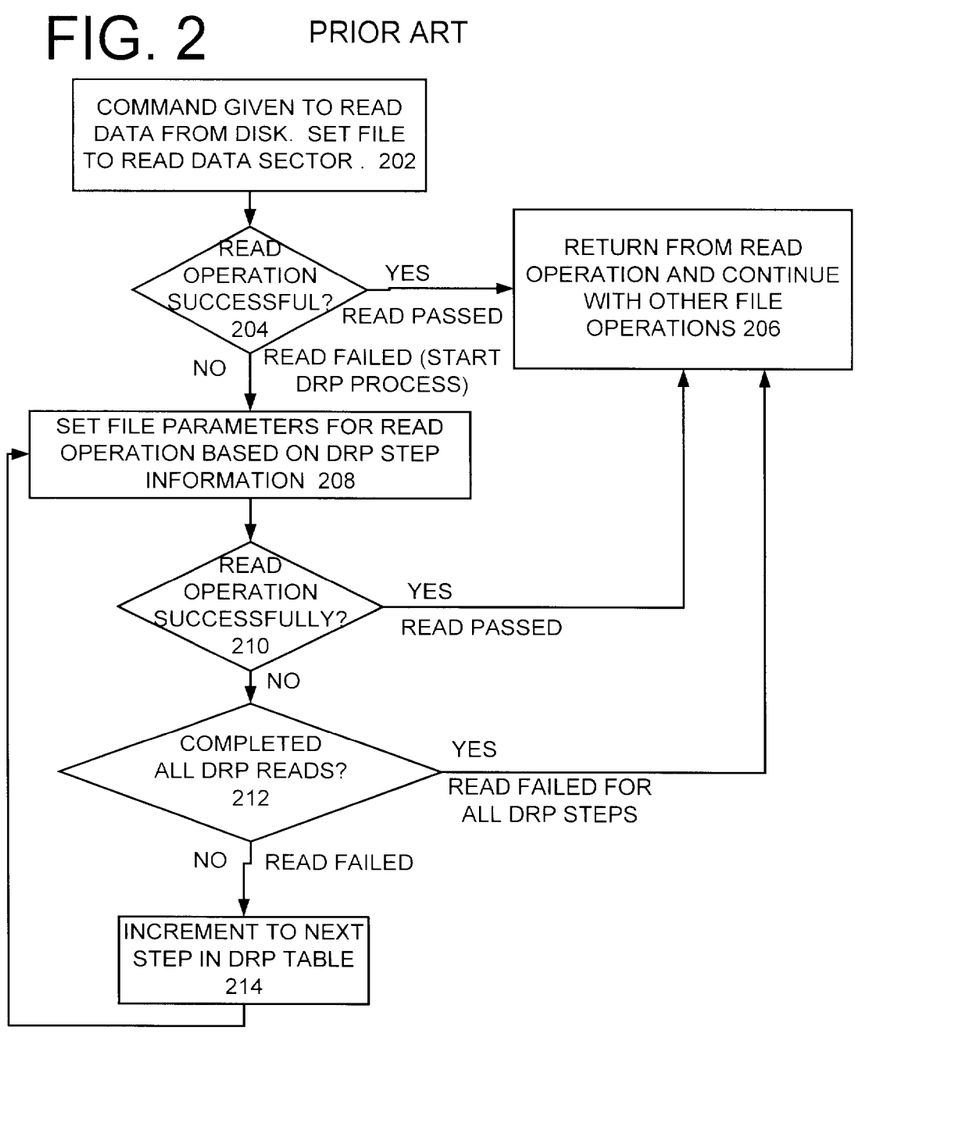
FIG. 2 is a flow chart illustrating a conventional data recovery procedure for a disk drive.

When problems arise detecting the customer data in a DASD, a data recovery procedure is started. All DASDs have operations or data recovery procedure (DRP) steps including multiple read operations that are performed in an attempt to correctly detect the customer data. FIG. 2 illustrates a conventional data recovery procedure for a disk drive. When an unsuccessful read operation is identified at decision block 204, then the DRP process is started. Predetermined file parameters are set based on the DRP step information at block 208 and the DRP step is performed. When an unsuccessful read operation for the DRP step is identified at decision block 210, then the DRP step is incremented to a next step in the DRP table. Then the predetermined file parameters are set based on this DRP step information at block 208 and the next DRP step is performed. As shown in FIG. 2, in known DASDs or disk drives, predefined data recovery procedure (DRP) steps are executed in a fixed order. For example, the first step is typically to read the same data on the next disk revolution, the 11th step might be to try to reset the magnetic head state by performing a dummy write. There may be, for example, 50 to 100 DRP steps used by a DASD or more DRP steps may be used depending on the architecture. The DRP steps are always the same and the process to retrieve the data follows the set of DRP steps in a fixed order.

A need exists for a mechanism to more efficiently implement data recovery procedures in a direct access storage device (DASD).

SUMMARY OF THE INVENTION

A principal object of the present invention is to provide a method and apparatus for implementing adaptive reordering of data recovery procedure steps in a direct access storage device (DASD). Other important objects of the present invention are to provide such method and apparatus for implementing adaptive reordering of data recovery procedure steps substantially without negative effect and that overcome many of the disadvantages of prior art arrangements.

In brief, a method and apparatus are provided for implementing adaptive reordering of data recovery procedure (DRP) steps in a direct access storage device (DASD). An initial set of DRP steps is stored. A reorder table is stored during the operation of the DASD. The reorder table includes data recovery data for each data head of successful predefined DRP step numbers. When a DRP process is started, checking for a modified DRP step is performed using the reorder table. Responsive to not identifying the modified DRP step, file parameters for a DRP read operation are set based on the initial set of DRP steps. Responsive to identifying the modified DRP step, file parameters for a DRP read operation are set based on a reordered DRP step that is identified by using the stored successful predefined DRP step numbers in the reorder table. When a successful DRP read operation is identified, the data recovery data in the reorder table are updated.

In accordance with features of the invention, the reordered DRP step is an identified most frequently occurring DRP step number in the reorder table for the current data head. The data recovery data for each data head stored in the reorder table includes a number of total errors, a number of errors above a set threshold, and a reorder flag. The reorder flag is set based upon the number of errors above the set threshold being at least a predefined percentage of the number of total errors. When the reorder flag is set, a reordered DRP step is identified using the stored successful predefined DRP step numbers in the reorder table.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
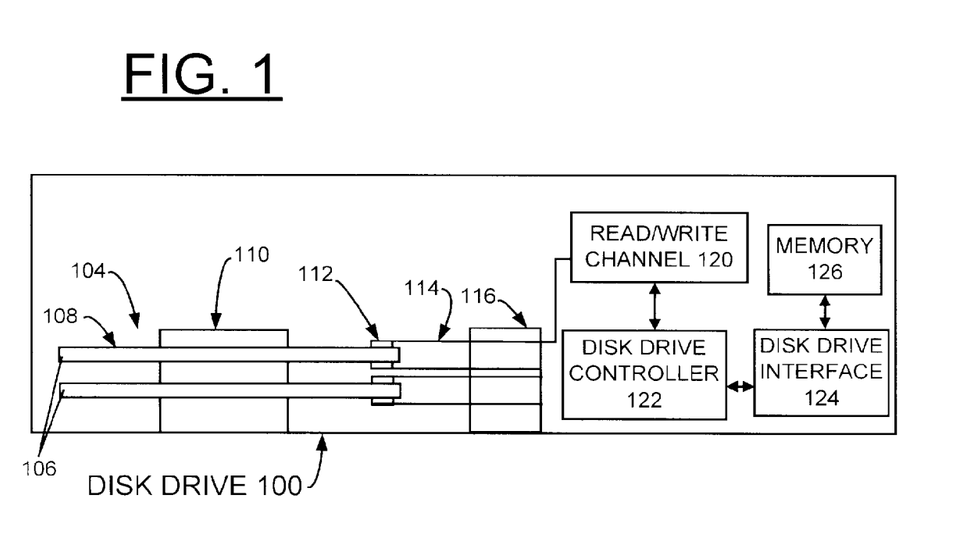
FIG. 1 is a schematic and block diagram representation illustrating a direct access storage device (DASD) for implementing methods for adaptive reordering of data recovery procedure steps for a disk drive in accordance with the preferred embodiment.

Having reference now to the drawings, in FIG. 1 there is illustrated a direct access data storage device (DASD) or disk drive generally designated as 100 for implementing adaptive reordering of data recovery procedure (DRP) steps for the disk drive 100 in accordance with the preferred embodiment. As shown in FIG. 1, disk drive 100 includes a stack 104 of disks 106 each having at least one magnetic surface 108. The disks 106 are mounted parallel to one another for simultaneous rotation on and by an integrated spindle and motor assembly 110. Information on each magnetic disk surface 108 is read from or written to the disk surface 108 by a corresponding transducer head assembly 112 movable in a path having a radial component across the rotating disk surface 108.

An arm 114 carries each transducer head assembly 112. The arms 114 are ganged together for simultaneous pivotal movement by a voice coil motor (VCM) magnet assembly or actuator 116. Drive signals applied to the VCM magnet assembly 116 cause the arms 114 to move in unison to position the transducer head assemblies 112 in registration with information storage tracks on the disk surfaces 108 where information is written or read.

Disk drive 100 includes a read/write channel 120 coupled to the transducer head assemblies 112 and coupled to a disk drive controller 122 that generates signals controlling the operation of various components of the disk drive 100. Disk drive 100 includes a disk drive interface 124 coupled to the disk drive controller 122 and a memory 126. A host computer (not shown) provides data read and write commands to the disk drive, and data signals are transmitted to or from the transducer head assemblies 112.

Figure 3:
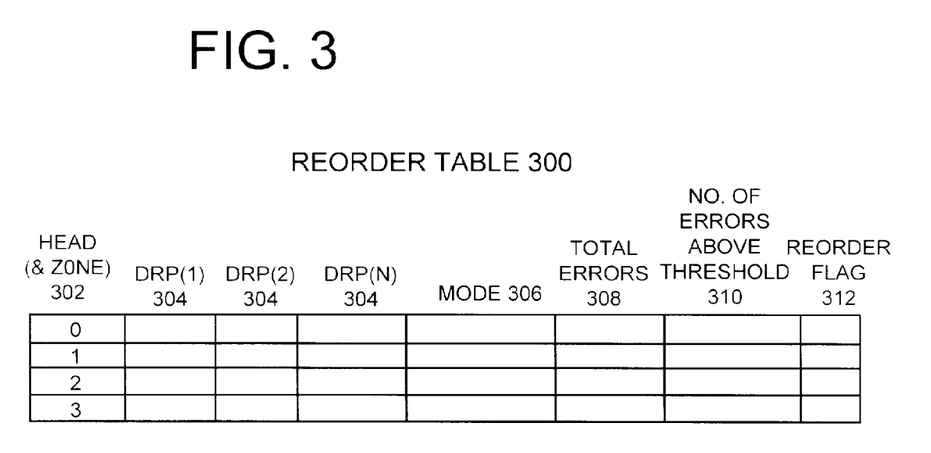
FIG. 3 is a diagram illustrating an exemplary reorder table for implementing adaptive reordering of data recovery procedure steps for a disk drive in accordance with the preferred embodiment.
Figure 4:
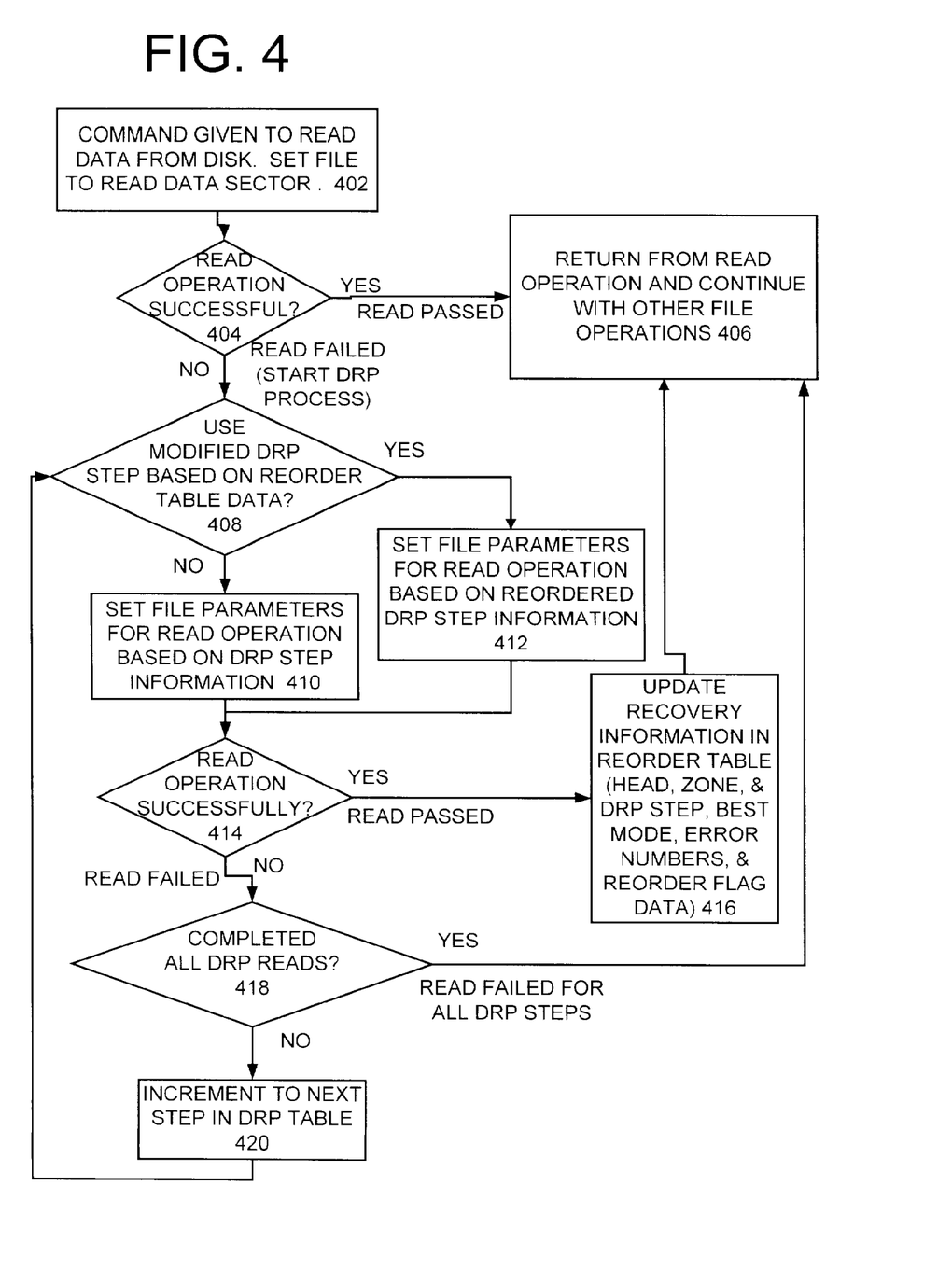
FIG. 4 is a flow chart illustrating exemplary sequential steps for implementing adaptive reordering of data recovery procedure steps for a disk drive in accordance with the preferred embodiment.

Disk drive controller 122 is suitably programmed for implementing adaptive reordering of data recovery procedure steps for the disk drive 100 in accordance with the preferred embodiment. Disk drive controller 122 is suitably programmed to generate a reorder table of the preferred embodiment as illustrated in FIG. 3 and to execute the flow functions of the preferred embodiment as illustrated in FIG. 4.

In accordance with features of the preferred embodiment, the disk drive 100 adaptively reorders the DRP steps so that the DRP step or DRP steps most likely to succeed are executed first. The reordered DRP step or reordered DRP steps are identified using most frequently occurring successful DRP steps that are stored with recovery procedure data in a reorder table of the preferred embodiment. For some situations, the conventional DRP order wastes time. For example, if it is known that resetting the head state works 90% of the time for a particular head 112, then it is wasteful to perform all of the steps leading up to this head state resetting step. It is better to try resetting the head first. For example, resetting the head multiple times are performed before trying off-track reads and the like which might typically precede the dummy write step. While the example of head instability has been given, there are other situations where reordering the DRP is advantageous. Therefore, a further aspect of the invention is to execute DRP steps in a logical manner depending on the nature of the recovery. For example, if for a given head and data zone data is normally recovered using either a 10 or 20% off-track position toward the disk ID, then when executing a DRP for this head, the DRP steps using ID off-track positions are used first for data recovery.

The invention begins by having a disk drive microprocessor or controller 122 create a reorder table 300 that shows, for each head, a number M of 5 last DRP step numbers that resulted in a successful recovery of data. Assuming a drive with 4 heads, a result might look like those illustrated in the following simplified example of Table 1. In Table 1, the last 5 DRP steps for heads 0 through 3 that resulted in successful data recovery are given. The example Table 1 shows that head 2 usually recovers on DRP step 11, while heads 0 and 1 recover on steps 1 or 2. Head 3 recovers on either steps 8 or 10 which can be assumed to be in the same off-track direction.

TABLE 1

| Head | DRP(1) | DRP(2) | DRP(3) | DRP(4) | DRP(5) | Mode |
|------|--------|--------|--------|--------|--------|------|
| 0 | 1 | 2 | 1 | 2 | 1 | 1 |
| 1 | 1 | 1 | 1 | 1 | 1 | 1 |
| 2 | 11 | 11 | 11 | 11 | 13 | 11 |
| 3 | 8 | 10 | 10 | 8 | 10 | 10 |

The second step that the invention performs is to calculate the statistical mode of the DRP step numbers for each head. The mode is defined as the most frequently occurring DRP step number in a stored sequence. The last column in Table 1 gives the mode for the last 5 DRP steps. Based on the modes for each head, heads 0 and 1 can continue to use the normal DRP ordering, that is step 1, step 2, step 3, and the like. For head 2, however, a better DRP order of reordered DRP steps is step 11, step 13, step 3, and the like.

The DRP steps can be reordered for this simple example shown in the above Table 1 in the following way:

Head 0: Step 1, Step 2, Step 3, . . . .
Head 1: Step 1, Step 2, Step 3, . . . .
Head 2: Step 11, Step 13, Step 3, . . . .
Head 3: Step 10, Step 8, Step 3, . . . .

The DRP also can be ordered to include single retries or reread steps first in case early recovery does occur as follows:

Head 0: Step 1, Step 2, Step 3, . . . .
Head 1: Step 1, Step 2, Step 3, . . . .
Head 2: Step 1, Step 2, Step 11, Step 13, Step 5, . . . .
Head 3: Step 1, Step 2, Step 10, Step 8, Step 5, . . . .

In accordance with features of the preferred embodiment, the disk drive 100 adaptively reorders the DRP steps for a given head, zone, and the like, at a predefined periodic interval, such as once every hour, or the adaptation can take place during periods of high DRP use. The invention can also be selectively applied to drives that are suffering data performance degradation.

Referring now to FIG. 3, there is shown an exemplary reorder table generally designated as 300 for implementing adaptive reordering of data recovery procedure steps for disk drive 100 in accordance with the preferred embodiment. As shown in FIG. 3, reorder table 300 stores each head (and zone) 302, a plurality of DRP buckets (1)—DRP (N) 304, a mode 306, a total errors 308, a number of errors above a threshold 310, and a reorder flag 312. Reorder table 300 is simplified for understanding the invention, with zone information not separately included in reorder table 300. Each of the plurality of DRP buckets (1)—DRP (N) 304 store the successful DRP steps identified during disk drive operations when processing each sequential data recovery procedure following a failed read operation of the disk drive 100. The total errors 308 are updated for each error processed including the initial DRP steps and the number of errors above a threshold 310 are updated for each error processed over a set threshold. The stored values in the total errors 308 together with the number of errors above a threshold 310 are used to determine when the DRP step for a particular head 302 should be reordered and then the reorder flag 312 is set. The mode 306 stores the most frequently occurring DRP step stored in the DRP buckets (1)—DRP (5) 304.

At power up of disk drive 100, the reorder table 300 can be empty or all fields 304, 306, 308 and 310 initially can be zero. Disk drive 100 stores a set of initial normal DRP steps that are, for example, as follows:

1. Reread; 2. Reread; 3. Reread; 4. Reread; 5. Reread; 6. Reread; 7. Off-track reread +5%; 8. Off-track reread −5%; 9. Off-track reread +10%; 10. Off-track reread −10%; 11. Start reread operation 2 bytes earlier; 12. Start reread operation 2 bytes earlier; 13. Off-track reread +15%; 14. Off-track reread −15%; 15. Off-track reread +18%.

In accordance with features of the preferred embodiment, a user selected threshold of a predefined number of steps, such as 6 initial DRP steps are performed before any values are put into the DRP buckets (1)-DRP(5) 304 sections of the reorder table 300. This is due to the fact that initial DRP steps 1 through 6 are simple rereads and it is not until later steps that file parameters are changed in the disk file 100. However, the total errors 308 are updated for each error processed including the initial DRP steps. The stored values in the total errors 308 together with the number of errors above a threshold 310 are used to determine when the DRP step for a particular head 302 should be reordered and then the reorder flag 312 is set. For example, when the number of errors above a threshold 310 are at least a predefined percentage of the total errors, such as, 30% and a value has been stored in all the DRP buckets (1)-DRP(5) 304, then the reorder flag 312 is set. The mode 302 stores the most frequently occurring or DRP step stored in the DRP buckets (1)-DRP(5) 306 to be used for reordering DRP steps when the reorder flag is set. It should be understood that the mode 306 field can be used for storing multiple DRP steps, such as the most frequent or DRP step together with one or more next most frequent or next DRP steps.

Creating the reorder table 300 may be understood by considering the following example 1 of read errors in disk drive 100:

| Error # | Error on Head | DRP Step used |
|---|---|---|
| 1 | 1 | 2 |
| 2 | 2 | 4 |
| 3 | 2 | 6 |
| 4 | 1 | 3 |
| 5 | 2 | 8 |
| 6 | 2 | 10 |
| 7 | 3 | 7 |
| 8 | 2 | 3 |
| 9 | 2 | 8 |
| 10 | 3 | 9 |

| -continued | | |
|---|---|---|
| Error # | Error on Head | DRP Step used |
| 11 | 2 | 8 |
| 12 | 2 | 10 |
| 13 | 1 | 7 |
| 14 | 0 | 2 |
| 15 | 2 | 3 |

As can be seen, head 2 has had at least 5 errors over step 6 and this is over 50% of the total errors for that head, with 5 errors above threshold and 9 total errors. With this example 1, using the criteria of reordering to be set when the errors above threshold 310 are greater than 30% of the total errors 308, the reorder flag is set for head 2 and results in the reorder table 300 for Example 1 as follows:

| REORDER TABLE 300 with errors above threshold 310 are greater than 30% of the total errors 308 for Example 1 | | | | | | | | | |
|---|---|---|---|---|---|---|---|---|---|
| Head 302 | DRP(1) 304 | DRP(2) 304 | DRP(3) 304 | DRP(4) 304 | DRP(5) 304 | Mode 306 | Total Errors 308 | Errors Above Threshold 310 | Reorder Flag 312 |
| 0 | 0 | 0 | 0 | 0 | 0 | 0 | 1 | 0 | 0 |
| 1 | 7 | 0 | 0 | 0 | 0 | 0 | 3 | 1 | 0 |
| 2 | 8 | 10 | 8 | 8 | 10 | 8 | 9 | 5 | 1 |
| 3 | 7 | 9 | 0 | 0 | 0 | 0 | 2 | 2 | 0 |

In this case, the successful DRP step that is used the most is DRP step 8 for head 2 followed by DRP step 10. Thus, when future errors are now found, reordering is used for head 2. For example, a predefined DRP step after a selected number of initial reread DRP steps, such as, DRP step 5 will now be reordered to the mode DRP step 8 (Off-track reread −5%) and step 6 will be reordered to the next mode DRP step 10 (Off-track reread −10%). The other steps can remain the same for now. Also, since reordering has now occurred for head 2, any time step 5 is used it will be listed as DRP step 8 from the reorder table 300, and step 6 will be listed as DRP step 10 from the reorder table 300. Also, the threshold for incrementing to the number of errors above threshold is now set for errors above 4 DRP steps instead of 6 initial DRP steps for head 2 since only 4 initial DRP reread steps are performed before the reordered steps 5 and 6.

Considering the following example 2 of read errors in disk drive 100 as the file continues to read:

EXAMPLE 2

| Error # | Error on Head | DRP Step used |
|---|---|---|
| 1 | 1 | 2 |
| 2 | 2 | 10 |
| 3 | 2 | 10 |
| 4 | 1 | 1 |
| 5 | 2 | 10 |
| 6 | 0 | 1 |
| 7 | 2 | 14 |

The oldest data is removed from the reorder table 300 first and the data recovery data in the reorder table are updated with first in/first out memory usage. With this example 2 and using the criteria of reordering to be set when the errors above threshold 310 are greater than 30% of the total errors 308, results in the reorder table 300 as follows:

REORDER TABLE 300 with criteria of errors above threshold 310 are greater than 30% of the total errors 308 for Example 2

| Head 302 | DRP(1) 304 | DRP(2) 304 | DRP(3) 304 | DRP(4) 304 | DRP(5) 304 | Mode 306 | Total Errors 308 | No. of Errors Above Threshold 310 | Reorder Flag 312 |
|---|---|---|---|---|---|---|---|---|---|
| 0 | 0 | 0 | 0 | 0 | 0 | 0 | 2 | 0 | 0 |
| 1 | 7 | 0 | 0 | 0 | 0 | 0 | 5 | 1 | 0 |
| 2 | 10 | 10 | 10 | 10 | 14 | 10 | 13 | 9 | 1 |
| 3 | 7 | 9 | 0 | 0 | 0 | 0 | 2 | 2 | 0 |

Now, step 5 will be replaced with DRP step 10 (Off-track reread −5%) and step 6 will be replaced with DRP step 14 (Off-track reread −15%). This process of generating the reorder table 300 continues until one of a number of factors changes it, for example, such as, when the user defined that a power cycle will reset the reorder table 300 or when the errors for head 2 start to all be below the 30% threshold, so that steps 5 and 6 become the initial DRP reread steps again.

FIG. 4 illustrates exemplary sequential steps for implementing adaptive reordering of data recovery procedure steps for a disk drive in accordance with the preferred embodiment. When a command is given to read data from the disk, the file is set to read a data sector as indicated in a block 402. Checking whether the read operation was successful is performed as indicated in a decision block 404. When the read operation was successful, then the sequential operations return from the read operation and continue with other file operations as indicated in a block 406. Otherwise, when the read operation was not successful or the read failed, then the DRP process is started by checking whether to use a modified DRP step based on data in the stored reorder table 300 as indicated in a decision block 408. For example, the reorder flag 312 for the current data head is checked at decision block 408. If a modified DRP step is not indicated, then the file parameters are set for a read operation based on normal DRP step information as indicated in a block 410. When the use of a modified DRP step is indicated based on the stored data in the stored reorder table 300, then the file parameters are set for a read operation based on reordered DRP step information in the stored reorder table 300 as indicated in a block 412. Checking whether the read operation was successful is performed as indicated in a decision block 414. When the read operation was successful, then the recovery information is updated in the reorder table 300 including for the current data head and zone 302, the successful DRP step number if above threshold in DRP bucket 304, mode 306, total error and errors above a threshold numbers 308 and 310, and the reorder flag 312 as indicated in a block 416. Then the sequential operations return from the read operation and continue with other file operations as indicated in a block 406. Otherwise, when the read operation was not successful or the read failed, then the DRP process continues by checking whether all DRP reads have been completed as indicated in a decision block 418. When all DRP reads have been completed, then the read failed for all DRP steps and the sequential operations return from the read operation and continue with other file operations as indicated in a block 406. When all DRP reads have not been completed, then the DRP step is incremented to the next step in the DRP table as indicated in a block 420. Then the sequential steps are continued returning to decision block 408 to again check whether to use a modified DRP step based on data in the stored reorder table 300.

Figure 5:
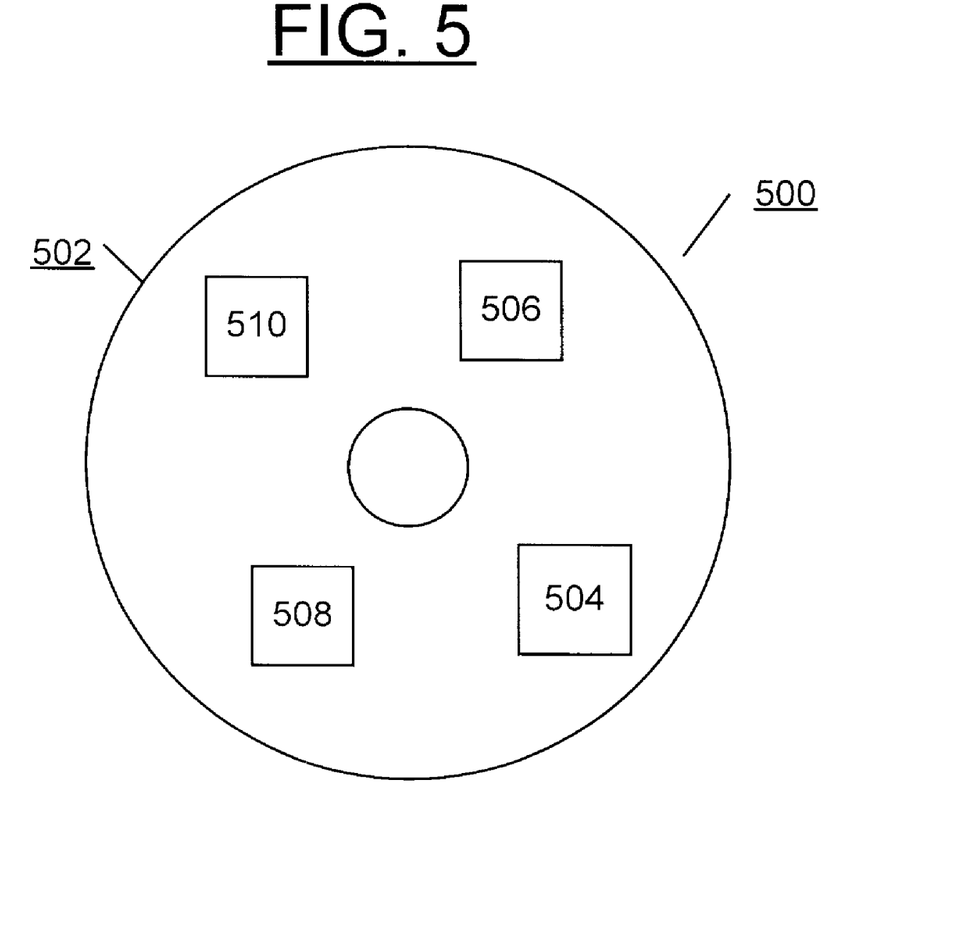
FIG. 5 is a block diagram illustrating a computer program product in accordance with the preferred embodiment.

Referring now to FIG. 5, an article of manufacture or a computer program product 500 of the invention is illustrated. The computer program product 500 includes a recording medium 502, such as, a floppy disk, a high capacity read only memory in the form of an optically read compact disk or CD-ROM, a tape, a transmission type media such as a digital or analog communications link, or a similar computer program product. Recording medium 502 stores program means 504, 506, 508, 510 on the medium 502 for carrying out the methods for implementing adaptive reordering of data recovery procedures of the preferred embodiment in the disk drive 100 of FIG. 1.

A sequence of program instructions or a logical assembly of one or more interrelated modules defined by the recorded program means 504, 506, 508, 510, direct the disk drive controller 122 for implementing adaptive reordering of data recovery procedures of the preferred embodiment.

While the present invention has been described with reference to the details of the embodiments of the invention shown in the drawing, these details are not intended to limit the scope of the invention as claimed in the appended claims.

What is claimed is:

1. A method for implementing adaptive reordering of data recovery procedure (DRP) steps in a direct access storage device (DASD) comprising the steps of:

storing an initial set of DRP steps;

storing a reorder table during operation of the DASD; said reorder table including data recovery data for each data head including successful predefined DRP step numbers;

starting a DRP process, checking for a modified DRP step using said reorder table;

responsive to not identifying said modified DRP step, setting file parameters for a DRP read operation based on a DRP step from said initial set of DRP steps;

responsive to identifying said modified DRP step, setting file parameters for a DRP read operation based on a reordered DRP step; said reordered DRP step identified using said stored successful predefined DRP step numbers in said reorder table; and identifying a successful DRP read operation and updating said data recovery data in said reorder table.

2. A method for implementing adaptive reordering of data recovery procedure (DRP) steps as recited in claim 1 wherein the step of storing said reorder table including said data recovery data includes the steps for each data head of storing a number of total errors, a number of errors above a set threshold, and a reorder flag.

3. A method for implementing adaptive reordering of data recovery procedure (DRP) steps as recited in claim 2 wherein includes the steps for storing said reorder flag includes the steps of setting said reorder flag based upon said number of errors above said set threshold being at least a predefined percentage of said number of total errors.

4. A method for implementing adaptive reordering of data recovery procedure (DRP) steps as recited in claim 1 further includes the step for each data head of storing a mode; said stored mode identifying a most frequently occurring one of said stored successful predefined DRP step numbers.

5. A method for implementing adaptive reordering of data recovery procedure (DRP) steps as recited in claim 1 wherein the step of setting file parameters for a DRP read operation based on a reordered DRP step includes the step of identifying a most frequently occurring one of said stored successful predefined DRP step numbers in said reorder table.

6. A method for implementing adaptive reordering of data recovery procedure (DRP) steps as recited in claim 1 includes the steps of performing a predefined number of initial steps from said initial set of DRP steps before the step of setting file parameters for a DRP read operation based on a reordered DRP step.

7. A method for implementing adaptive reordering of data recovery procedure (DRP) steps as recited in claim 1 wherein the steps of identifying said successful DRP read operation and updating said data recovery data in said reorder table includes the steps of removing oldest stored recovery data from said reorder table and storing said updated data recovery data.

8. A method for implementing adaptive reordering of data recovery procedure (DRP) steps as recited in claim 7 wherein the step of storing said updated data recovery data includes the step of storing said successful DRP step number; updating a total errors number; and updating a number of errors above a set threshold.

9. A method for implementing adaptive reordering of data recovery procedure (DRP) steps as recited in claim 8 includes the step of setting a reorder flag responsive to said updated number of errors above said set threshold being at least a predefined percentage of said number of total errors.

10. A method for implementing adaptive reordering of data recovery procedure (DRP) steps as recited in claim 1 includes the steps of identifying a failed DRP read operation and incrementing to a next step in said stored initial set of DRP steps; and checking for said modified DRP step using said reorder table.

11. Apparatus for implementing adaptive reordering of data recovery procedure (DRP) steps in a direct access storage device (DASD) comprising:
   a disk drive controller;
   a memory coupled to said disk drive controller for storing an initial set of DRP steps and a reorder table; said reorder table including data recovery data for each data head;
   said disk drive controller for starting a DRP process, and checking for a modified DRP step using said reorder table;
   said disk drive controller responsive to not identifying said modified DRP step, for setting file parameters for a DRP read operation based on a DRP step from said initial set of DRP steps;
   said disk drive controller responsive to identifying said modified DRP step, for setting file parameters for a DRP read operation based on a reordered DRP step; said reordered DRP step being identified by using said said reorder table; and
   said disk drive controller for identifying a successful DRP read operation and for updating said data recovery data in said reorder table.

12. Apparatus for implementing adaptive reordering of data recovery procedure (DRP) steps in a direct access storage device (DASD) as recited in claim 11 wherein said disk drive controller for identifying said successful DRP read operation and for updating said data recovery data in said reorder table includes said disk drive controller for storing said successful DRP step number; updating a total errors number; and updating a number of errors above a set threshold.

13. Apparatus for implementing adaptive reordering of data recovery procedure (DRP) steps in a direct access storage device (DASD) as recited in claim 12 includes said disk drive controller for storing a reorder flag, responsive to said updated total errors number; and said updated number of errors above said set threshold.

14. Apparatus for implementing adaptive reordering of data recovery procedure (DRP) steps in a direct access storage device (DASD) as recited in claim 13 includes said disk drive controller for setting said reorder flag responsive to said updated number of errors above said set threshold being at least a predefined percentage of said number of total errors.

15. A computer program product for implementing adaptive reordering of data recovery procedure (DRP) steps in a disk drive, said computer program product including a plurality of computer executable instructions stored on a computer readable medium, wherein said instructions, when executed by a disk drive controller in the disk drive, cause the disk drive controller to perform the steps of:
   storing a reorder table during operation of the DASD; said reorder table including data recovery data for each data head;
   starting a DRP process, checking for a modified DRP step using said reorder table;
   responsive to not identifying said modified DRP step, setting file parameters for a DRP read operation based on a DRP step from said initial set of DRP steps;
   responsive to identifying said modified DRP step, setting file parameters for a DRP read operation based on a reordered DRP step; said reordered DRP step identified using said reorder table; and
   identifying a successful DRP read operation and updating said data recovery data in said reorder table.

16. A computer program product for implementing adaptive reordering of data recovery procedure (DRP) steps as recited in claim 15 wherein said instructions, when executed by a disk drive controller in the disk drive, for updating said data recovery data in said reorder table includes the steps of:
   storing said successful DRP step number; updating a total errors number; updating a number of errors above a set threshold; and setting a reorder flag responsive to said updated number of errors above said set threshold being at least a predefined percentage of said number of total errors.

* * * * *